Jan. 14, 1936.  E. T. HARDY  2,027,773
WEED PULLER
Filed May 4, 1935
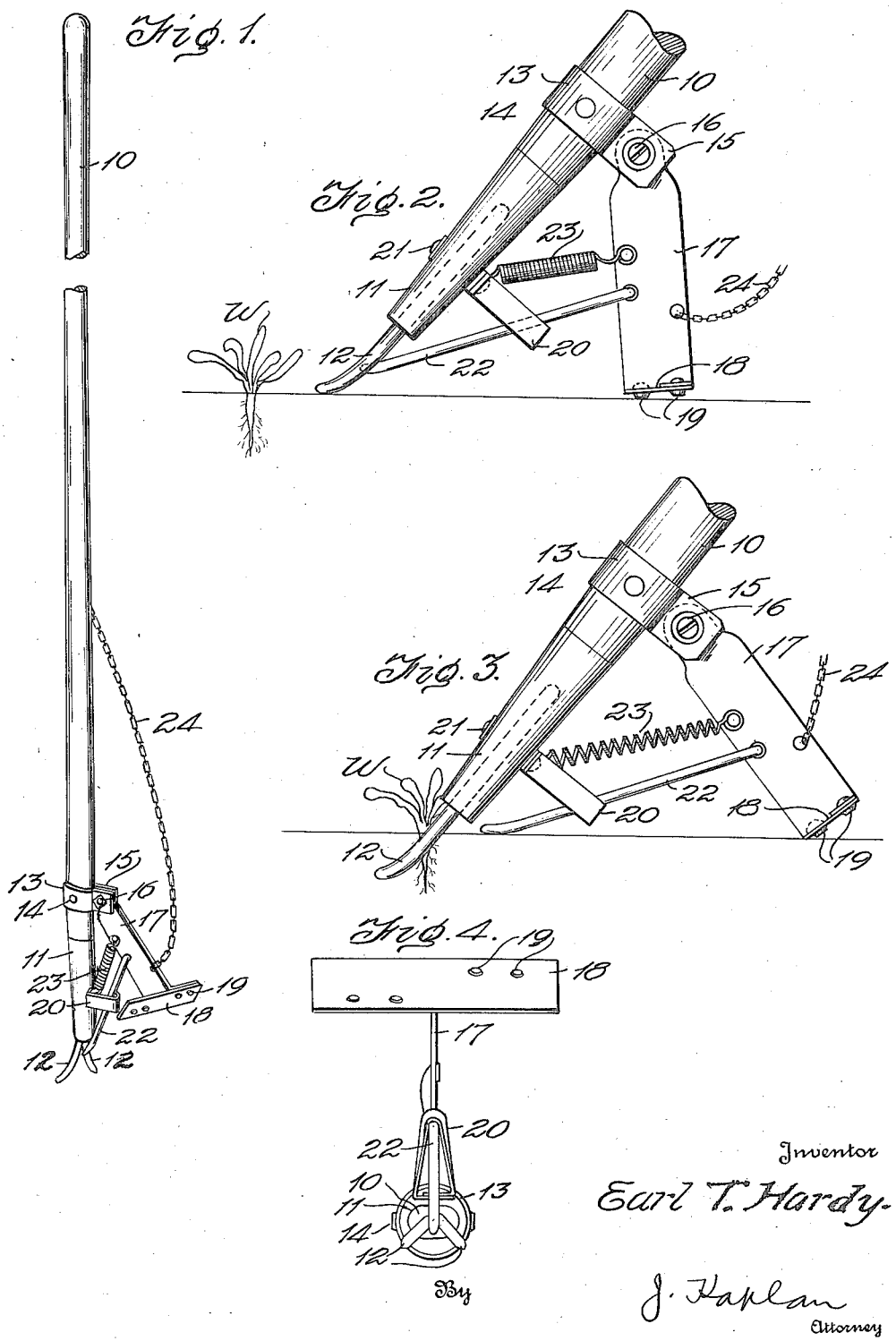

UNITED STATES PATENT OFFICE 2,027,773

WEED PULLER

Earl Tom Hardy, Portland, Oreg.

Application May 4, 1935, Serial No. 19,861

9 Claims. (Cl. 254—132)

This invention relates to agricultural implements and has special reference to a weed puller.

In devices for this purpose it is common to provide means to penetrate the earth and grasp the weed root underground, the device carrying the root being then lifted or pried from the ground.

One important object of the invention is to improve the general construction of devices of this description.

In using weed pullers it frequently happens that the weed cannot be easily cleared off the root gripping means after it is pulled and one must use his fingers to free the weed thus soiling the hands.

A second important object of the invention is to provide a weed puller having a novel and improved construction for freeing the weed from the root gripping means.

A third important object of the invention is to arrange the novel weed pulling and freeing device so that the latter will be entirely automatic in operation.

With the above and other objects in view, as will be presently explained, the invention consists in general of certain novel details of construction and combinations of parts hereinafter fully described, illustrated in the accompanying drawing and specifically claimed.

In the accompanying drawing like characters of reference indicate like parts in the several views, and:—

Figure 1 is a perspective view of the weed puller.

Figure 2 is an enlarged side elevation of the lower or operating part of the weed puller in position ready for insertion in the ground.

Figure 3 is a view similar to Figure 2 but showing the device in position ready to lift the weed.

Figure 4 is a bottom plan view of the puller taken in a plane at right angles to the longitudinal axis of the handle of the weed puller.

In the embodiment of the invention as herein disclosed there is provided a handle 10 on the lower end of which there is fitted a tapered sleeve or ferrule 11. A pair of prongs or tines 12 are seated in the handle 10 within the sleeve 11 and project downwardly from the handle. Adjacent the handle these tines extend parallel and in closely spaced relation while their lower ends are flared outwardly from each other and are curved forwardly as seen in Figures 2 and 4.

Above the sleeve 11 there is provided a strap or collar 13 held in position by a pin or rivet 14 which passes through the handle transversely of its axis. The ends of this collar extend outwardly from the handle to form a pair of spaced parallel ears 15 wherethrough passes a pivot bolt 16. A leg 17 has its upper end pivoted to the bolt 16 between the ears 15 and on its lower or free end this leg is provided with a flat foot 18 which extends laterally from both sides of the leg. The leg and foot are secured together by rivets 19 which project from the bottom of the foot to form ground engaging calks.

Projecting laterally from the sleeve 11 is a guide loop 20 which is held in position by a bolt 21 which extends through the handle 10 and thus also assists in holding the sleeve on the handle. Through this loop extends a finger 22 which has its upper end pivotally connected to the leg 17 about midway the length of the latter and this guide loop serves to guide the lower end of the finger 22 to a position between the tines 12 and normally at the middle of their flaring portions. A coiled tension spring 23 has one end connected to the leg 17 and its other end held by the bolt 21. This spring serves to urge the finger 22 to its normal position. A chain 24 connects the leg 17 to the handle 10 and serves to limit the swinging movement of the leg.

In use the device is placed near a weed 22 with the foot resting on the ground as shown in Figure 2. Pressure is now exerted longitudinally of the handle in the direction of the tine provided end. This causes rocking of the leg on the ground and the insertion of the tines into the ground in such position that they straddle the weed root which is thereby wedged into the narrow part of the space between said tines. As this occurs the finger 22 is withdrawn from between the tines, the spring 23 expanding to permit this action. The withdrawal of the finger 22 leaves the space between the tines free to receive the weed root. The tine end of the device is now lifted and the weed pulled out of the ground. When the foot 18 clears the ground the spring swings the leg and finger to normal position so that the finger enters the space between the tines and dislodges the weed. If it be desired to delay the dislodging of the weed, so that it may be placed on a pile or in a suitable receptacle, the chain 24 may be grasped and pulled to prevent the spring from contracting. Thus the finger will be held back as in Figure 3 until the operating end of the device can be placed over the pile or receptacle whereupon the tension on the chain may be relaxed and the finger allowed to operate and free the weed.

There has thus been provided a simple and efficient device of the kind described and for the purpose specified.

It is obvious that changes may be made in the form and construction of the invention without departing from the material principles involved. It is not, therefore, desired to confine the invention to the exact form herein shown and described but it is desired to include all such forms as come within the scope of the appended claims.

What is claimed, is:—

1. In a weed puller, a handle, a pair of diverging tines carried by said handle at its lower end, a finger movable into and out of position with its lower end between said tines, such finger pivoted to a leg, said leg pivotally connected to said handle, said leg adapted to retract the finger upon insertion of said tines into the ground.

2. In a weed puller, a handle, a pair of diverging tines carried by said handle at its lower end, a finger movable into and out of position with its lower end between said tines, such finger pivoted to a leg, said leg pivotally connected to said handle, said leg adapted to retract the finger upon insertion of said tines into the ground, and a spring urging said finger into position with its lower end between the tines.

3. In a weed puller, a handle, a pair of diverging tines carried by said handle at its lower end, a finger movable into and out of position with its lower end between said tines, such finger pivoted to a leg, said leg pivotally connected to said handle, said leg adapted to retract the finger upon insertion of said tines into the ground, a spring urging said finger into position with its lower end between the tines, and means to restrain said spring from operating said finger, said means including a chain attached to said finger.

4. In a weed puller, a handle, a pair of diverging tines carried by the lower end of said handle, a leg pivotally connected to the handle and diverging downwardly from the handle, a foot on the free end of said leg adapted to rest on the ground during the insertion of the tines in the ground, and a finger pivoted at one end to said leg and guided to have its free end move into and out of position between said tines, said foot moving away from the handle and retracting the finger upon insertion of said tines in the ground.

5. In a weed puller, a handle, a pair of diverging tines carried by the lower end of said handle, a leg pivotally connected to the handle and diverging downwardly from the handle, a foot on the free end of said leg adapted to rest on the ground during the insertion of the tines in the ground, a finger pivoted at one end to said leg and guided to have its free end move into and out of position between said tines, said foot moving away from the handle and retracting the finger upon insertion of said tines in the ground, and a spring urging said finger into position with its lower end between the tines.

6. In a weed puller, a handle, a pair of diverging tines carried by the lower end of said handle, a leg pivotally connected to the handle and diverging downwardly from the handle, a foot on the free end of said leg adapted to rest on the ground during the insertion of the tines in the ground, a finger pivoted at one end to said leg and guided to have its free end move into and out of position between said tines, said foot moving away from the handle and retracting the finger upon insertion of said tines in the ground, a spring urging said finger into position with its lower end between the tines, and means to restrain said spring from operating said finger.

7. In a weed puller, a handle, a pair of diverging tines carried by the lower end of said handle, a leg pivotally connected to the handle and diverging downwardly from the handle, a foot on the free end of said leg adapted to rest on the ground during the insertion of the tines in the ground, a finger pivoted at one end to said leg and guided to have its free end move into and out of position between said tines, said foot moving away from the handle and retracting the finger upon insertion of said tines in the ground, and a coiled tension spring having one end connected to said leg and its other end connected to said handle.

8. In a weed puller, a handle, a pair of diverging tines carried by the lower end of said handle, a leg pivotally connected to the handle and diverging downwardly from the handle, a foot on the free end of said leg adapted to rest on the ground during the insertion of the tines in the ground, a finger pivoted at one end to said leg and guided to have its free end move into and out of position between said tines, said foot moving away from the handle and retracting the finger upon insertion of said tines in the ground, a coiled tension spring having one end connected to said leg and its other end connected to said handle, and means to restrain said spring from operating said finger.

9. In a weed puller, a handle, a pair of diverging tines carried by the lower end of said handle, a leg pivotally connected to the handle and diverging downwardly from the handle, a foot on the free end of said leg adapted to rest on the ground during the insertion of the tines in the ground, a finger pivoted at one end to said leg and guided to have its free end move into and out of position between said tines, said foot moving away from the handle and retracting the finger upon insertion of said tines in the ground, a coiled tension spring having one end connected to said leg and its other end connected to said handle, and a chain having one end connected to the leg and its other end connected to the handle at a distance above the leg.

EARL TOM HARDY.